Aug. 3, 1943.  B. L. SMITH ET AL  2,326,075
CUT FILM HOLDER FOR PHOTOGRAPHIC CAMERAS
Filed May 13, 1942  5 Sheets-Sheet 4
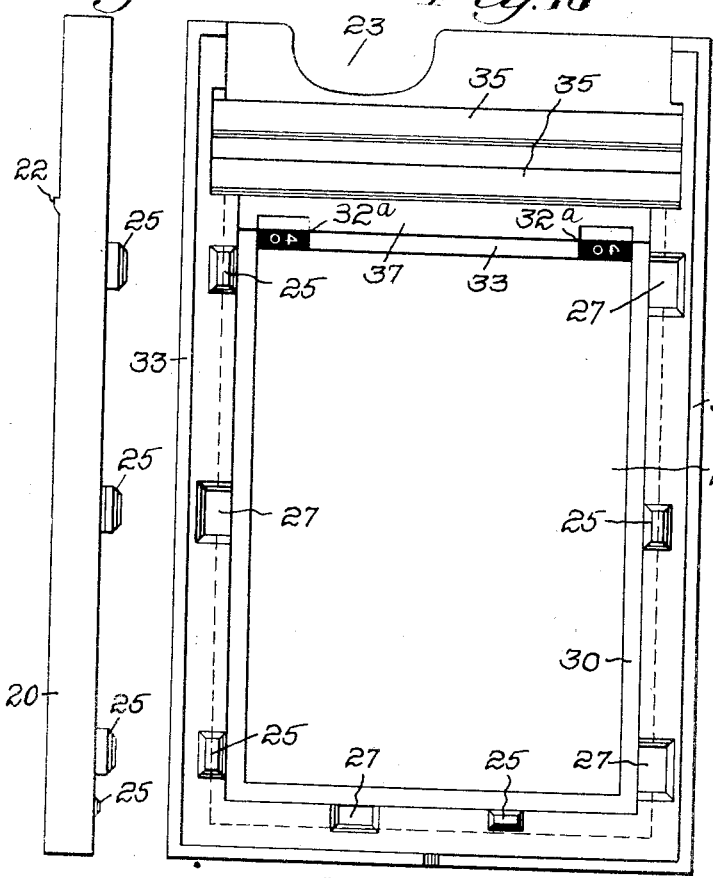
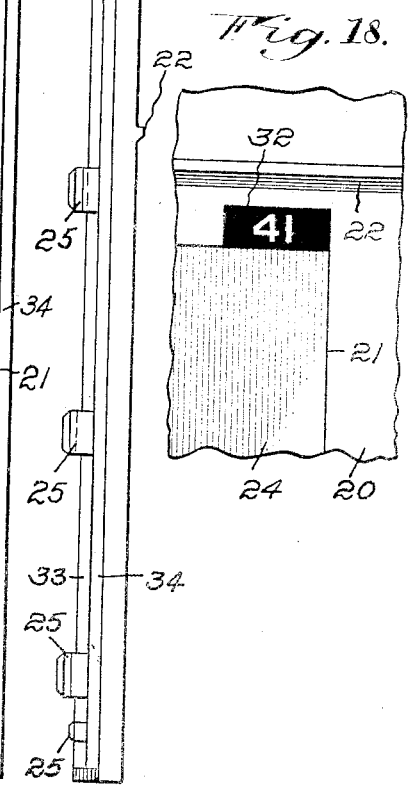
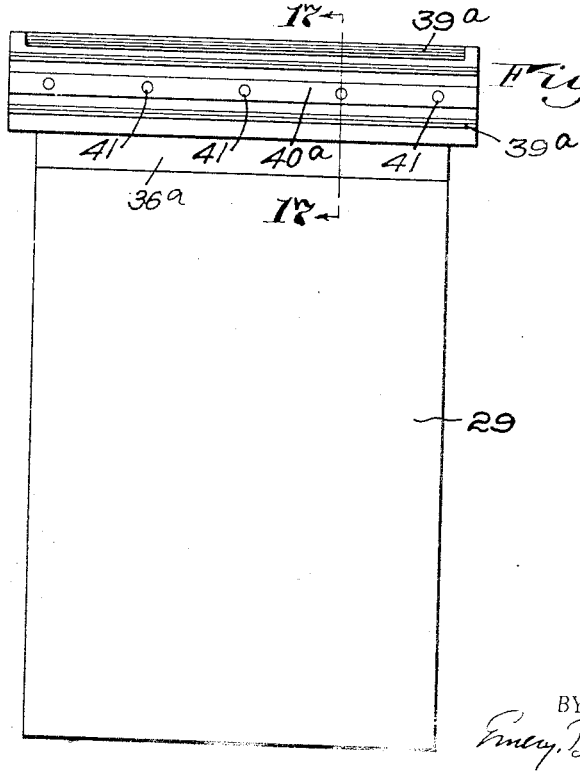
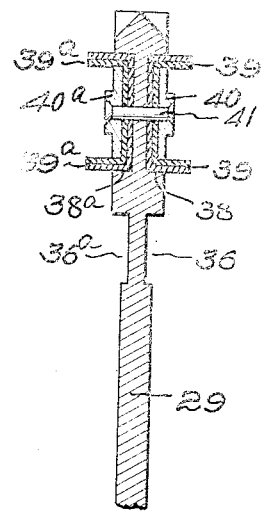
INVENTORS
Byron L. Smith
Vernon E. Whitman,
BY
their ATTORNEYS

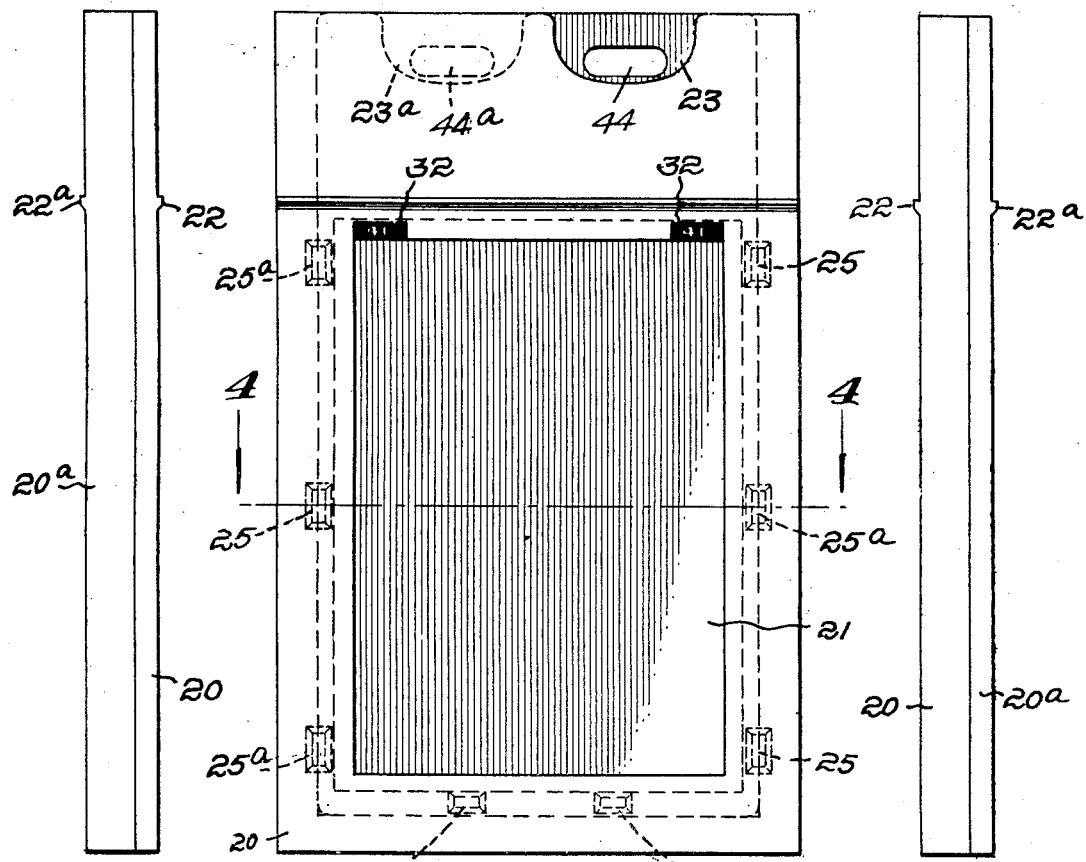
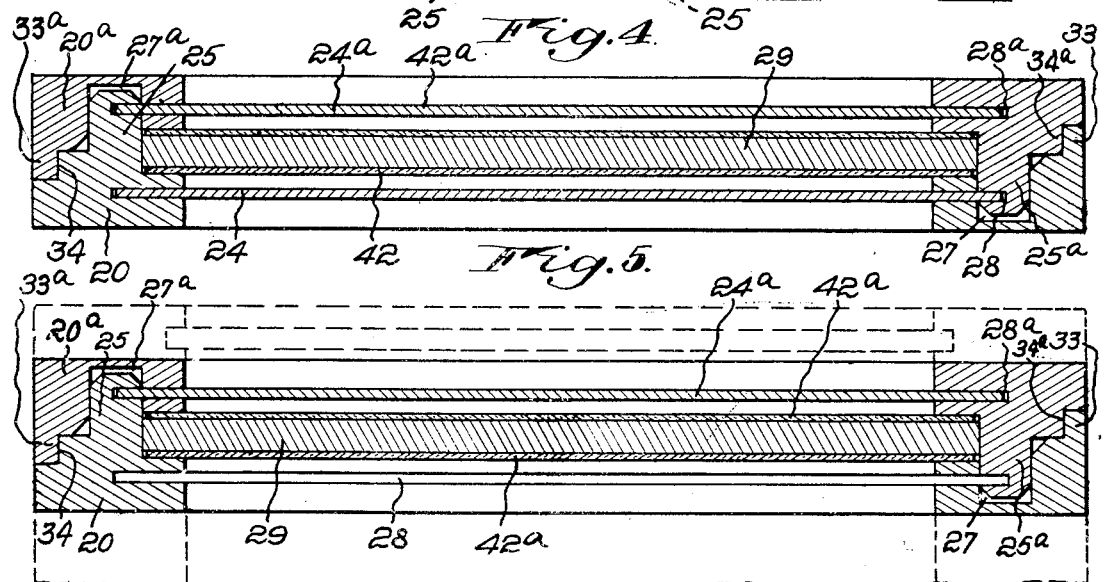

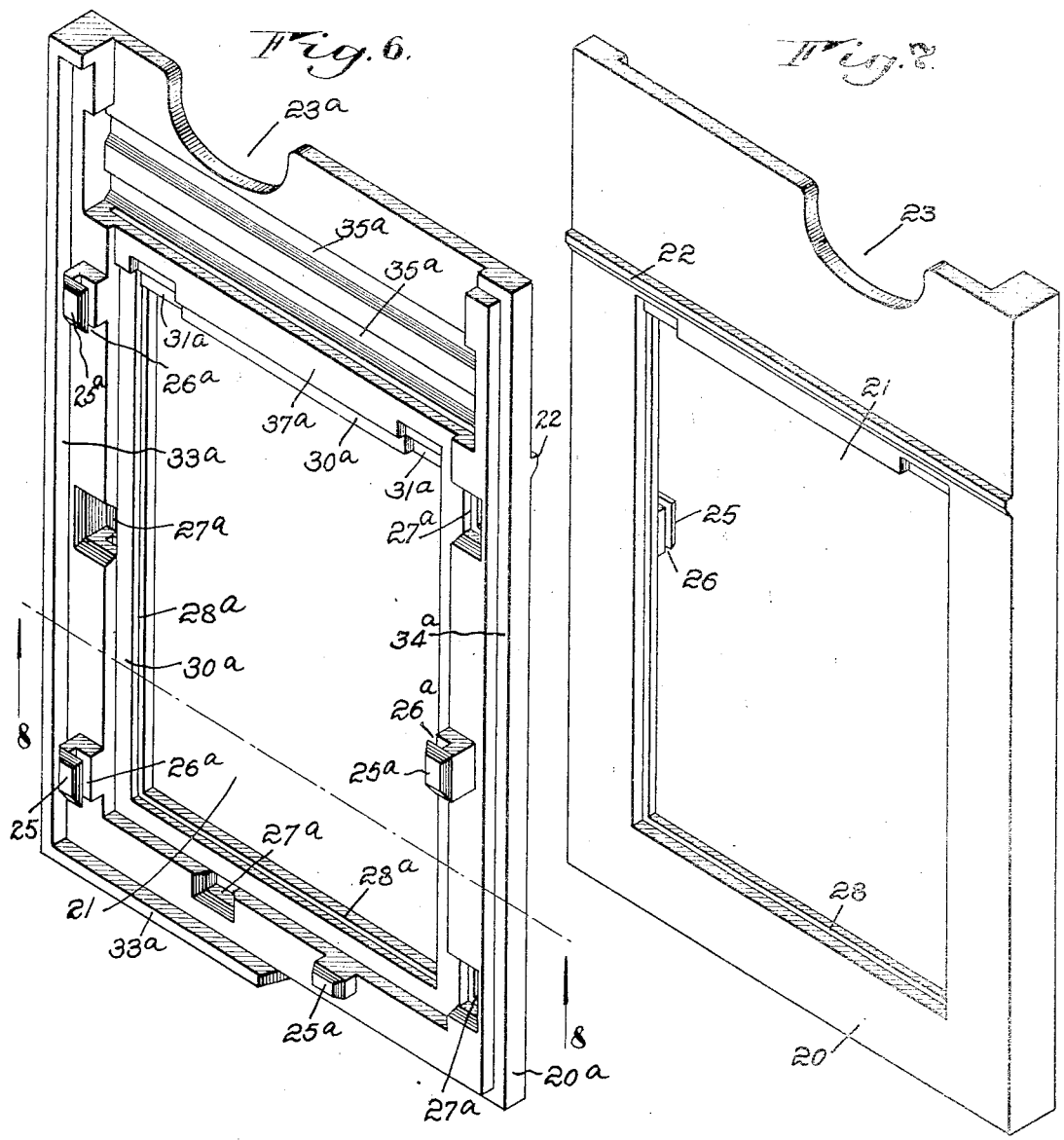
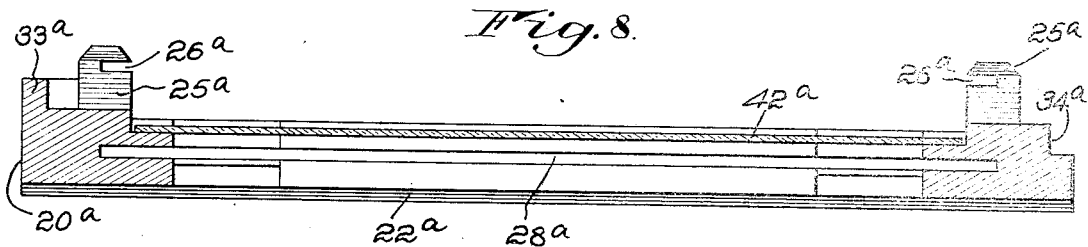

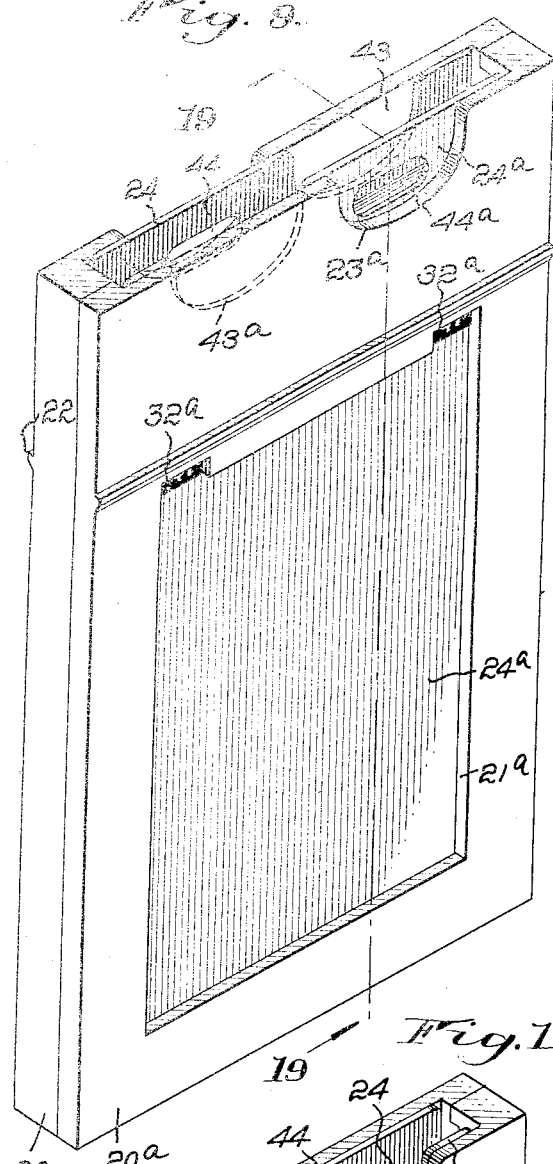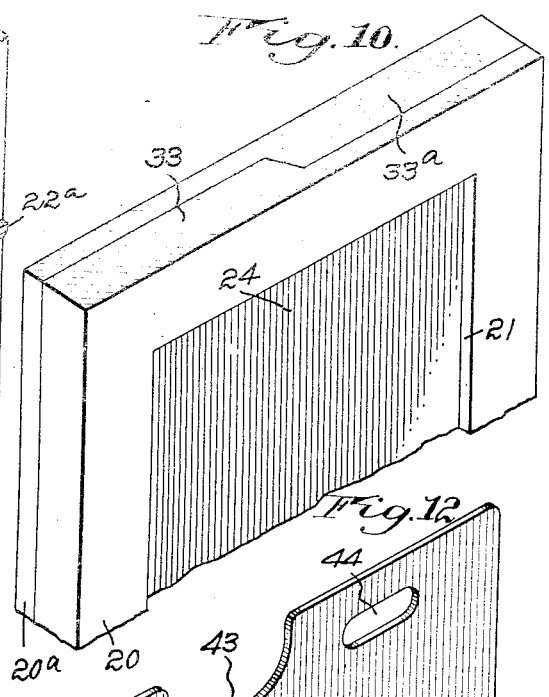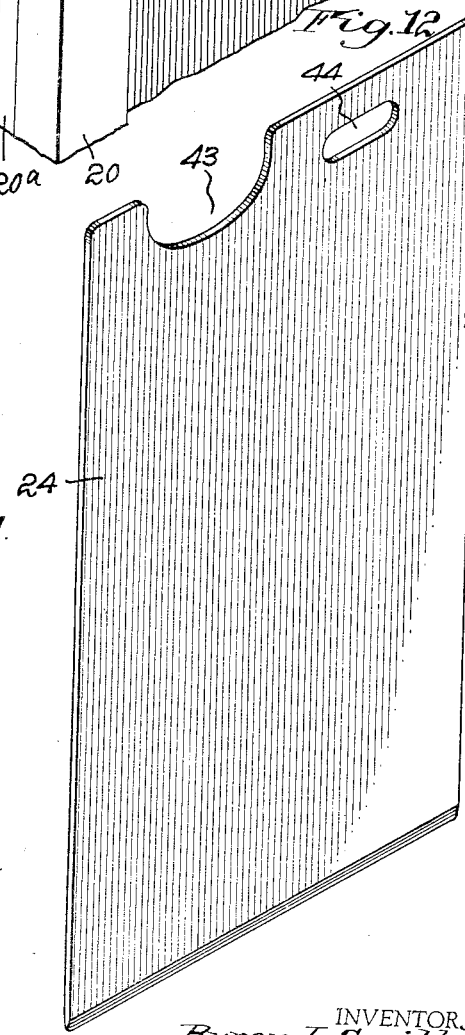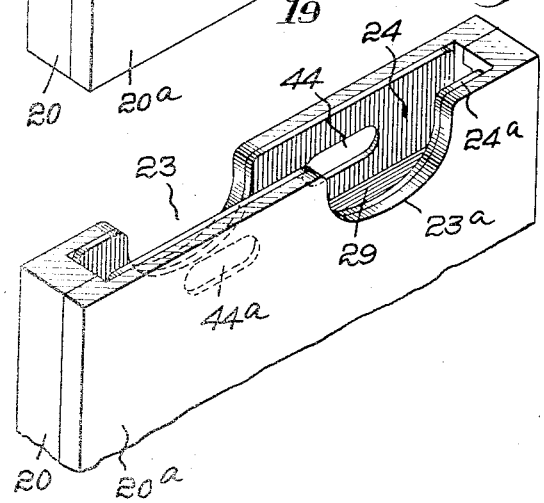

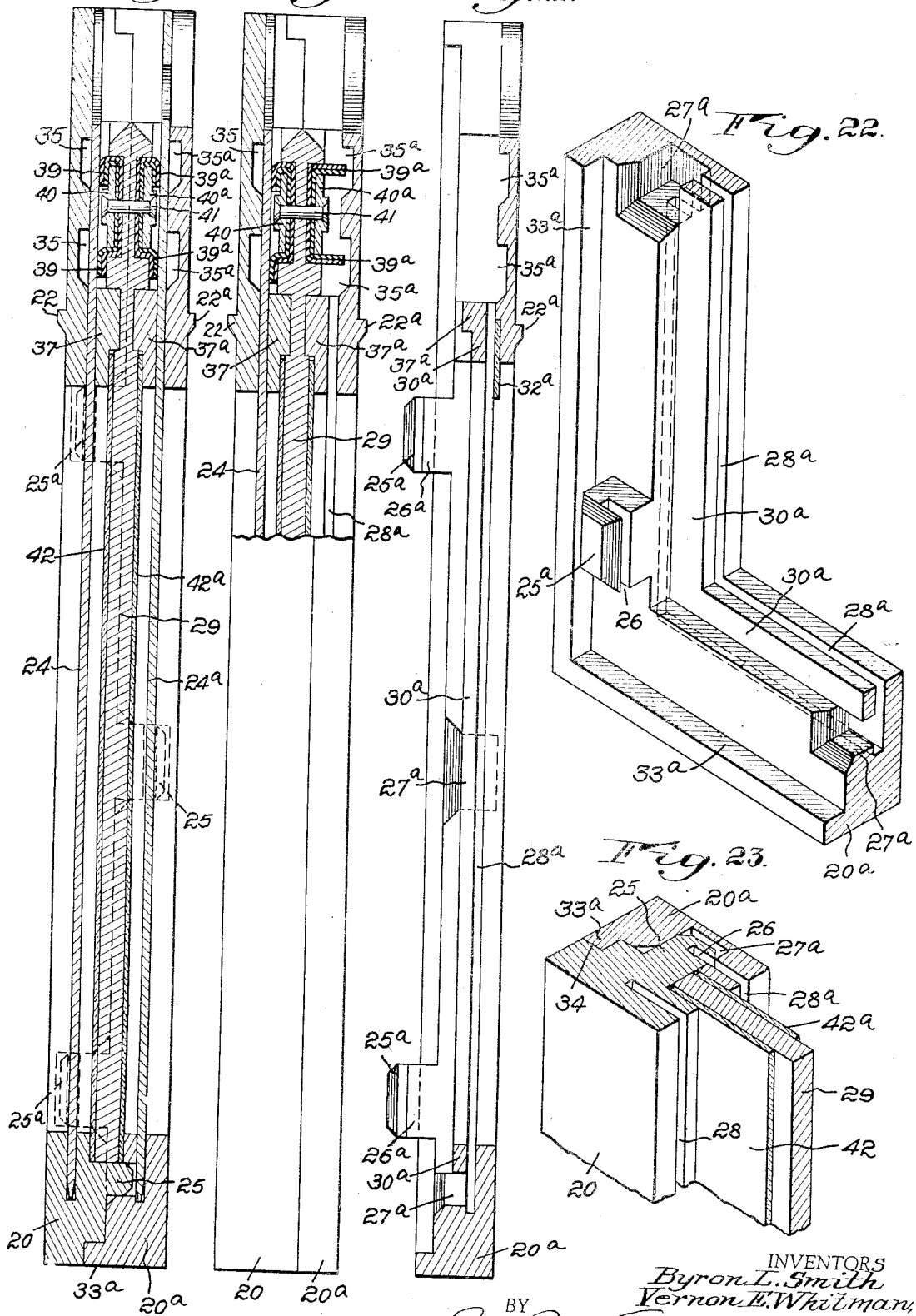

Patented Aug. 3, 1943

2,326,075

UNITED STATES PATENT OFFICE 2,326,075

CUT FILM HOLDER FOR PHOTOGRAPHIC CAMERAS

Byron L. Smith, East Rochester, and Vernon E. Whitman, Rochester, N. Y., assignors to The Folmer Graflex Corporation, Rochester, N. Y., a corporation of Delaware Application May 13, 1942, Serial No. 442,774

16 Claims. (Cl. 95—66)

This invention relates to new and improved cut film holders for photographic cameras.

In order that the principle of the invention may be readily understood, we have disclosed a single embodiment thereof in the accompanying drawings, wherein Fig. 1 is a front elevation of the holder in its assembled condition with both dark slides in place;

Fig. 2 is a left hand elevation of Fig. 1;

Fig. 3 is a right hand elevation of Fig. 1;

Fig. 4 is a horizontal section through the holder, taken on the line 4—4 of Fig. 1;

Fig. 5 is a similar view to Fig. 4, but showing the holder in place in a camera partly represented by dotted lines;

Fig. 6 is an inside elevation showing the structure of one of the castings;

Fig. 7 is an outside elevation of the holder casting;

Fig. 8 is a transverse section through the holder casting taken on the line 8—8 of Fig. 6;

Fig. 9 is an isometric view in elevation of the assembled holder with the dark slides in position to indicate a loaded holder, the film being unexposed;

Fig. 10 is an isometric partial view in elevation of the holder when turned up-side-down, showing how the two holder parts fit together at the bottom;

Fig. 11 is an isometric view having the lower part broken away and similar to Fig. 9, but showing the dark slides in position to indicate that the film has been exposed;

Fig. 12 is an isometric view of one of the dark slides;

Fig. 13 is an inside view in elevation of one of the castings, two of which make up the complete holder;

Fig. 14 is a left hand elevation of Fig. 13;

Fig. 15 is a right hand view in elevation of Fig. 13;

Fig. 16 is an elevation of the holder central member;

Fig. 17 is a vertical section taken through Fig. 16 on the line 17—17 thereof;

Fig. 18 is a fragmentary detail in elevation of Fig. 1 on an enlarged scale, showing the numbering device;

Fig. 19 is a vertical cross section on an enlarged scale taken through the holder on the line 19—19 of Fig. 9, showing sensitized material and both dark slides in place;

Fig. 20 is an end elevation of the holder, partially in section and on an enlarged scale having sensitized material in place, one of the dark slides being removed for making an exposure;

Fig. 21 is a vertical cross section on an enlarged scale of one of the castings, showing the construction thereof and also indicating the location of the numbering device;

Fig. 22 is a fragmentary section of Fig. 6 on an enlarged scale, showing the construction of the main holder castings; and Fig. 23 is an isometric view in section through the holder when assembled, showing the position of the sensitized material with respect to the holder parts, namely, the main holder castings and the central casting.

There has long been need for a cut-film holder wherein the accuracy of depth of focus could readily be maintained. By depth of focus, we mean the distance between the plane of the sensitized material and the back of the camera to which the holder is fitted. Holders manufactured in the usual manner, principally from wood, do not maintain a sufficient accuracy. A number of metal holders have appeared from time to time, but they were constructed substantially the same as the usual wooden holders with the exception that metal was used instead of wood, and they did not possess the advantages of our new holder.

Our invention provides a holder that can be manufactured of any of the molding materials, either metal or plastics. We prefer, however, to manufacture such new holder from plastic material.

Among the objects of our invention are: to provide a film holder that is simple in construction; to provide a holder that can be readily molded from either metal or plastic; to provide a holder made up of two principal sections that are identical (that is, made in the same mold); to provide a holder that is locked together by the dark slides, either one or both slides serving as locking means; to provide a holder that will hold the film absolutely flat; to provide a film numbering device or means visible when the dark slide is in place; to provide a holder having a central replaceable member to which are attached the light valves, which can be readily replaced when worn; to provide a holder made up of a minimum number of molded parts that require no additional fitting or machining to render them ready for use; to provide a holder that will maintain an accurate focal depth; and to provide a holder that can be received in existing cameras without modification of the camera.

Herein the disclosed embodiment of the invention is described as made up from any one of the well known plastics. It will be apparent, however, that a metal die casting will serve equally well, though plastics have certain advantages from the standpoint of cost and weight and the finishing problem becomes very much more simple.

The holder herein disclosed, which is primarily intended for use with cut film, may within the broad scope and purpose of the invention be used for receiving any suitable sensitized surface, and while therefore throughout the specification the holder is referred to as one for cut films, it is to be understood that the invention is not necessarily limited to such use though intended particularly therefor.

So far as we are aware, we are the first to construct a sensitized-surface holder that within the broad scope of the invention may receive only a single sensitized sheet, or which may be duplex, it being here shown as one. The said holder is composed of two duplicate main body castings receiving between them a central longitudinally extending member whereby a duplex holder is provided, and the two body castings of which holder are held together only by the dark slides, no other securing means being required.

Having thus stated the broad novelty of the invention, we will describe in detail the single embodiment thereof that is selected as the preferred embodiment, and in the ensuing description the two members that are identical in structure will as to all parts thereof be identified by the same reference numerals, a letter exponent being always used in referring to the parts of one of said members.

Referring more particularly to the drawings, the film holder is shown in assembled condition in Figs. 1, 2 and 3, and in the other figures the parts are shown in detail, as will be clearly evident from the ensuing description thereof.

As already stated, the holder is made up of two main body castings that are exactly alike in structure in that they are both made from the same mold. As already stated, the castings may be made from any suitable plastic material or metal.

Throughout the specification, what is termed the front casting and parts thereof are identified by reference numerals without an exponent, and the back casting and parts thereof are identified by the same reference numerals with a letter exponent.

The said front and back castings are respectively indicated generally at 20 and 20a, each having a large opening 21, 21a, through which the exposure is made. The said body castings are also provided with the usual light locks 22, 22a, and with preferably semicircular openings 23, 23a to make the dark slides 24, 24a accessible to the operator. The said body castings 20, 20a are shown separated in Figs. 6 and 7, the back view of the casting 20a being shown in Fig. 6 and the front view of casting 20 being shown in Fig. 7. The said body castings are provided with a series of locking members 25, 25 and 25a, 25a having slots 26, 26 and 26a, 26a. The said body castings are also provided with depressions, sockets or openings 27, 27 and 27a, 27a for receiving the locking members 25, 25a respectively. The locking members 25a fit into the depressions, sockets or openings 27 and the locking members 25 fit into the openings 27a, as clearly shown in Figs. 4 and 5. The said body castings 20, 20a are provided with grooves or slots 28, 28a for receiving the said dark slides 24, 24a.

Fitted between the said body castings 20, 20a is a film-supporting central member 29, shown in transverse section in Figs. 4 and 5, in vertical section in Fig. 17, and in elevation in Fig. 16. The said body castings 20, 20a have formations constituting recesses or ledges 30, 30a for receiving sensitized material and for receiving the said central member 29. In the upper edges of said formations 30, 30a are provided depressions 31, 31a for supporting film numbering tabs 32, 32a. The said body castings 20, 20a are provided with light locks 33, 33a encircling the structure partially or to the desired extent, and with steps 34, 34a, thereby forming a complete light lock when the holder is in the assembled position. The said light locks 33, 33 are fitted into said steps 34a, 34a and the said light locks 33a, 33a are fitted in said steps 34, 34.

The said body castings 20, 20a are provided with molded-in channels or depressions 35, 35 and 35a, 35a, for receiving light valves hereinafter described in detail.

The said central member 29 is formed as a flat rectangular casting having depressions 36, 36a engaged by raised beads 37, 37a, shown in Figs. 13, 19 and 20, etc., to hold securely the said central member 29 in position and also to act as a light trap. The upper end of the said central member 29 is provided with a second pair of depressions 38, 38a, into which are fitted the light valves 39, 39a, shown in Figs. 17, 19, 20, etc., and which can be composed of any suitable material such as rubber, felt or special synthetic material. The said light valves 39, 39a are held in place by plates 40, 40a that are themselves securely held to the said central member 29 by rivets 41, 41. When the said central member 29 is in place and the body castings 20, 20a are assembled, the complete holder is thus constituted, as best indicated in the section views, Figs. 19 and 20, in the former of which both dark slides 24, 24a are in position for excluding all light from the sensitized material 42, 42a, herein indicated as sheets of cut film, while in Fig. 20 one dark slide 24a has been withdrawn from the holder to expose the sensitized material 42a. Therein the light valve 39a is shown as extending into the groove 35a so as to exclude all light from passing through the slide groove 28a and thereby protecting the sensitized material 42a.

It will be understood from the foregoing description that the dark slides 24, 24a act as the only means to hold or secure or lock together the two main body castings 20, 20a. Thus they act as what may be termed a keying means for the purpose. The openings 26, 26a of the locking members 25 and 25a align with the grooves or slots 28, 28a, as shown in Fig. 23, etc., when the holder is in assembled condition. When the dark slides are placed in the holder into grooves or slots 28, 28a, the slots 26, 26a will be engaged by the dark slides 24, 24a, thus securely holding the assembly together.

It will be noted that even though one dark slide is withdrawn, the assembly will still be held together and can only be disassembled when both dark slides are withdrawn. This provides a novel construction requiring no auxiliary or additional locks of any nature. When the dark slide 24 is in place, the holder will be held in assembled condition by reason of the fact that the dark slide 24 engages the slots 26a in the locking members 25a, and when the dark slide 24a is in place, the holder will be additionally retained in assembled condition by reason of the fact that the dark slide 24a engages the slots 26 of the locking members 25. In order to disassemble the holder, it is only necessary to remove both dark slides.

Desirably the said dark slides 24, 24a are of a construction that serves as an indicator to inform the operator whether or not the sensitized material has been exposed. This result is preferably accomplished by having a large, preferably substantially semicircular opening 42 and a preferably smaller elongated opening 44. When the said opening 44 is visible through the opening 23, this fact indicates that the film or sensitized material has not yet been exposed. After making an exposure, the dark slide 24 is reversed before it is replaced in the holder, and this act aligns the semicircular opening 43 with the opening 23, thus indicating that the film has been exposed.

In order to load the holder with sensitized material, the dark slides 24, 24a are withdrawn, allowing the body castings 20, 20a to be separated from the central member 29. A sheet of sensitized material is laid in the body of the casting 20 on the ledges 30, 30. The central member 29 is then laid on top of the sensitized material, and at the same time the groove 36 is aligned with the projection 37. A second sheet of sensitized material is then laid on the central member 29 and aligned with the four edges of said central member. The body casting 20a is then put in place on top of the sensitized material and the central member 29. The dark slides 24, 24a are then put in place as indicated in Figs. 1 and 9. The holder is now ready for use and may be placed in the camera indicated in dotted lines in Fig. 5. The dark slide 24 is then withdrawn and an exposure made, after which the dark slide 24 is reversed and returned to the holder, and the opening 43 will align with the opening 23.

To make a second exposure, the holder is removed from the camera and reversed and again placed in the camera. The dark slide 24a is then withdrawn and a second exposure is made, after which said dark slide 24a is reversed and replaced, the opening 43a of the slide 24a aligning with the opening 23a as indicated in Fig. 11. All of said operations are very simple and practically preclude error.

In order to remove sensitized material from the holder, the latter is taken into the dark room and the dark slides are withdrawn, after which the body casting 20 can then be lifted from the body casting 20a, whereupon the film sheet 42 is removed from the central member 29 which is itself then lifted from the body casting 20a and the film sheet 42a can be removed. The film holder can be reloaded as already explained.

We have provided means whereby the sensitized material will always be identified with respect to the holder because of the presence of tabs 32, 32a which are attached to the holder castings shown in Fig. 21. The said tabs 32, 32a are of some suitable opaque material having transparent numerals indicated in Fig. 18. When the dark slides 24, 24a are in place, the holder numerals are easily read from said tabs 32, 32a. When the holder is placed in the camera and a dark slide is removed, light passing through the lens through the sensitized material also passes through the transparent portion of the film tab 32 or 32a, thereby forming a numeral on the sensitized material, thereby recording thereon the number of the holder in which the sensitized material was exposed. There can thus never be any question as to film identification because the same numeral that identifies the holder is used for making a record on the sensitized material. Obviously other indications than numerals may be used on the tabs 32, 32a, such as the initials of the operator or any other pertinent data, as, for example, something indicating the type of film or sensitized material used.

The holder herein described is the result of a long period of experimentation and development required to provide a holder that can be readily manufactured, but which maintains a high degree of accuracy and which permits the keeping of cost of production in line with existing holders. If the holder be made of plastic material, there is no finishing problem nor is it necessary to take unusual precautions to prevent corrosion, there being no exposed metal parts.

The term "casting" is herein used in a broad sense to include founding or forming or molding, as by pouring molten matter into a mold.

Having thus described one illustrative embodiment of the invention, it is to be understood that although specific terms are employed, they are used in a generic and descriptive sense and not for purposes of limitation, the scope of the invention being set forth in the following claims.

We claim:

1. A holder for sensitized material to be used in photographic cameras, having two duplicate body members, each of general open rectangular formation and adapted to be assembled in a face-to face relation to constitute the lengthwise and widthwise extent of the holder, each said body member having at least one locking projection and at least one depression on the face thereof which is its inner face when the said two members are so assembled with each such locking projection of one of said members received in such a depression of the other of said members, and at least one dark slide, one of said body members having in one lengthwise extending inner edge a groove for an edge of such dark slide, and the other body member having a groove in its locking projection or projections into which an edge of said dark slide enters, whereby the said two body members are held together by said dark slide.

2. A photographic holder according to claim 1, but wherein two dark slides are provided for reception in the said grooves of the said body members.

3. A photographic holder according to claim 1, but wherein there are provided a series of such locking projections and an equal series of such depressions.

4. A photographic holder according to claim 1, but wherein two dark slides are provided, each such slide being received in a groove formed in two opposite-facing longitudinal edges of one of said body members and is also received in the grooves of the locking projections of the other of said body members.

5. A photographic holder according to claim 1, but wherein a central sensitized-surface supporting member is received between the formations on the inner faces of said two main body members.

6. A photographic holder according to claim 1, but wherein the said projections and depressions are short in length, and wherein there is along each of the side parts and along the bottom part of each rectangular body member a plurality of the formations constituting said projections and depressions.

7. A photographic holder according to claim 1, but wherein there is at least one such projection and one such depression along each of the side parts and along the bottom part of each of the said rectangular body members.

8. A photographic holder according to claim 1, but wherein the said projections and depressions are short in length, and wherein there is along each of the side parts and along the bottom part of each rectangular body member a plurality of the formations constituting said projections and depressions, and wherein there are slots for the reception of the edge of a dark slide in facing inner edges of the projections that are on the side parts of each body member at the specified inner face thereof.

9. A photographic holder according to claim 1, but wherein a central sensitized-surface supporting member is received between the formations on the inner faces of said two main body members, and wherein there is a sensitized surface supporting member received between the facing portions of the lengthwise extending side parts of the two body members when so assembled.

10. A photographic holder according to claim 1, but wherein a central sensitized-surface supporting member is received between the formations on the inner faces of said two main body members, and wherein there is a sensitized surface supporting member received between the facing portions of the lengthwise extending side parts of the two body members when so assembled, and wherein the said sensitized-surface supporting member is provided with light valves near its upper end at opposite faces thereof.

11. A photographic holder according to claim 1, but wherein a central sensitized-surface supporting member is received between the formations on the inner faces of said two main body members, and wherein there is a sensitized-surface supporting member received between the facing portions of the lengthwise extending side parts of the two body members when so assembled, and wherein the said sensitized-surface supporting member has at both faces, near its upper end, a transversely extending recess wherein light excluding material is secured.

12. A photographic holder in accordance with claim 1, but wherein each of said body members is provided with a depression for supporting an identifying tab at a part thereof adjacent the sensitized surface when inserted.

13. A holder for sensitized material to be used in photographic cameras, composed entirely of two duplicate body members constituting the lengthwise and widthwise extent of the holder, a film-supporting central member therebetween, and a pair of dark slides; each said body member having at the face thereof, which is its inner face when the said two body members are assembled in face-to-face relation, one or more locking projections and one or more depressions, each of such locking projections being adapted to be received in such a depression of the other body member, said film-supporting central member being received between facing portions of said body members when so assembled, each said body member having grooves for the reception of the two dark slides and including grooves in the said locking projections, whereby when the said parts are assembled each dark slide is received in a groove or grooves of each body member and also in the groove in the locking projection or projections.

14. As a new article of manufacture and for use in a photographic holder, and as such constituting one of a pair of body members of the holder; an open rectangular member having a length and a breadth commensurate with such dimensions of the entire holder, said body member having a series of locking projections and depressions at the face thereof which is its inner face when such pair of body members are assembled in face-to-face relation, said projections and depressions being for reciprocal engagement with like locking depressions and projections on the other body member of the said pair.

15. As a new article of manufacture and for use in a photographic holder, and as such constituting one of a pair of body members of the holder; an open rectangular member having a length and a breadth commensurate with such dimensions of the entire holder, said body member having a series of locking projections and depressions at the face thereof which is its inner face when such pair of body members are assembled in face-to-face relation, said projections and depressions being for reciprocal engagement with like locking depressions and projections on the other body member of the said pair, some of said locking projections being distributed along the opposite longitudinally-extending parts of said rectangular member and having grooves in an inwardly facing edge thereof for the reception of a dark slide.

16. As a new article of manufacture and for use in a photographic holder, and as such constituting one of a pair of body members of the holder; an open rectangular member having a length and a breadth commensurate with such dimensions of the entire holder, said body member having a series of locking projections and depressions at the face thereof which is its inner face when such pair of body members are assembled in face-to-face relation, said projections and depressions being for reciprocal engagement with like locking depressions and projections on the other body member of said pair, some of said locking projections being distributed along the opposite longitudinally-extending parts of said rectangular member and having grooves in an inwardly facing edge thereof for the reception of a dark slide, said body member also having, in said longitudinally-extending parts, grooves for the reception of another dark slide of the assembled holder.

BYRON L. SMITH.
VERNON E. WHITMAN.